United States Patent
Galles et al.

(10) Patent No.: US 7,638,012 B2
(45) Date of Patent: Dec. 29, 2009

(54) LAMINATION OF PATCH FILMS ON PERSONALIZED CARDS THROUGH HEAT TRANSFER

(75) Inventors: Donald Galles, Blaine, MN (US); Peter Edward Johnson, Maple Grove, MN (US)

(73) Assignee: DataCard Corporation, Minnetonka, MN (US)

( * ) Notice: Subject to any disclaimer, the term of this patent is extended or adjusted under 35 U.S.C. 154(b) by 483 days.

(21) Appl. No.: 11/557,615

(22) Filed: Nov. 8, 2006

(65) Prior Publication Data

US 2007/0102104 A1    May 10, 2007

Related U.S. Application Data

(60) Provisional application No. 60/735,273, filed on Nov. 10, 2005, provisional application No. 60/748,740, filed on Dec. 9, 2005.

(51) Int. Cl.
*B44C 1/17* (2006.01)
*B29C 65/18* (2006.01)
*B32B 37/30* (2006.01)

(52) U.S. Cl. ............ 156/234; 156/235; 156/238; 156/247; 156/277; 156/289; 156/308.4; 156/537; 156/540; 156/541; 156/580; 156/583.1

(58) Field of Classification Search ............ 156/228, 156/230, 234, 235, 238, 247, 277, 289, 308.2, 156/308.4, 391, 537, 538, 539, 540, 541, 156/580, 581, 583.1
See application file for complete search history.

(56) References Cited

U.S. PATENT DOCUMENTS 3,346,440 A * 10/1967 Kruger .................. 156/583.3
4,133,926 A * 1/1979 Vorrier et al. ............... 428/200
4,380,484 A * 4/1983 Repik et al. ................. 156/251
4,402,597 A * 9/1983 McCormick-Goodhart .. 355/64
4,416,719 A * 11/1983 Horiuchi .................... 156/359

(Continued)

FOREIGN PATENT DOCUMENTS

CN          1351540 A      5/2002

(Continued)

OTHER PUBLICATIONS

First Office Action issued by the State Intellectual Property Office of the People's Republic of China in Application Number CN 200680042096.1 on Sep. 11, 2009.

*Primary Examiner*—Philip C Tucker
*Assistant Examiner*—Sing P Chan
(74) *Attorney, Agent, or Firm*—Hamre, Schumann, Mueller & Larson, P.C.

(57) ABSTRACT

An apparatus and method for laminating personalized cards, which includes a frame that supports a supply spindle for delivering a patch film disposed on a web to a personalized card. The frame supports a platen structure for affixing a portion of the patch film to a portion of one side of the personalized card when the supply spindle delivers the patch film to the personalized card. The frame supports a take-up spindle for receiving the web after the patch film has been delivered to the personalized card. The frame supports a lamination assembly for laminating the entire patch film to the entire side of the personalized card after the personalized card has had the patch partially affixed thereto.

21 Claims, 16 Drawing Sheets

U.S. PATENT DOCUMENTS

| | | | |
|---|---|---|---|
| 4,650,536 A * | 3/1987 | Ceraso | 156/364 |
| 4,818,852 A * | 4/1989 | Haddock et al. | 235/488 |
| 4,825,054 A | 4/1989 | Rust et al. | |
| 5,045,139 A * | 9/1991 | Vonk | 156/152 |
| 5,266,781 A | 11/1993 | Warwick et al. | |
| 5,489,356 A * | 2/1996 | Drower | 156/269 |
| 5,673,076 A * | 9/1997 | Nardone et al. | 347/171 |
| 5,739,835 A * | 4/1998 | Morgavi et al. | 347/176 |
| 5,776,287 A * | 7/1998 | Best et al. | 156/260 |
| 5,781,316 A * | 7/1998 | Strahl et al. | 359/3 |
| 5,788,806 A * | 8/1998 | Bradshaw et al. | 156/539 |
| 5,821,976 A * | 10/1998 | Inagaki et al. | 347/218 |
| 5,959,278 A * | 9/1999 | Kobayashi et al. | 235/449 |
| 6,095,220 A * | 8/2000 | Kobayashi et al. | 156/540 |
| 6,187,129 B1 * | 2/2001 | Vaidya et al. | 156/275.5 |
| 6,315,023 B1 * | 11/2001 | King et al. | 156/494 |
| 6,350,342 B1 * | 2/2002 | Steidinger et al. | 156/257 |
| 6,459,880 B1 * | 10/2002 | Russell | 399/408 |
| 6,776,933 B1 | 8/2004 | Chatwin et al. | |
| 6,817,530 B2 * | 11/2004 | Labrec et al. | 235/487 |
| 6,902,107 B2 | 6/2005 | Shay et al. | |
| 7,438,105 B2 * | 10/2008 | Guionnet et al. | 156/378 |
| 2007/0099462 A1 * | 5/2007 | Helma et al. | 439/159 |
| 2007/0235141 A1 * | 10/2007 | Chin | 156/552 |

FOREIGN PATENT DOCUMENTS

| | | |
|---|---|---|
| JP | 2001-219681 | 8/2001 |
| KR | 2001-0053105 | 6/2001 |
| WO | 99/67092 | 12/1999 |

\* cited by examiner

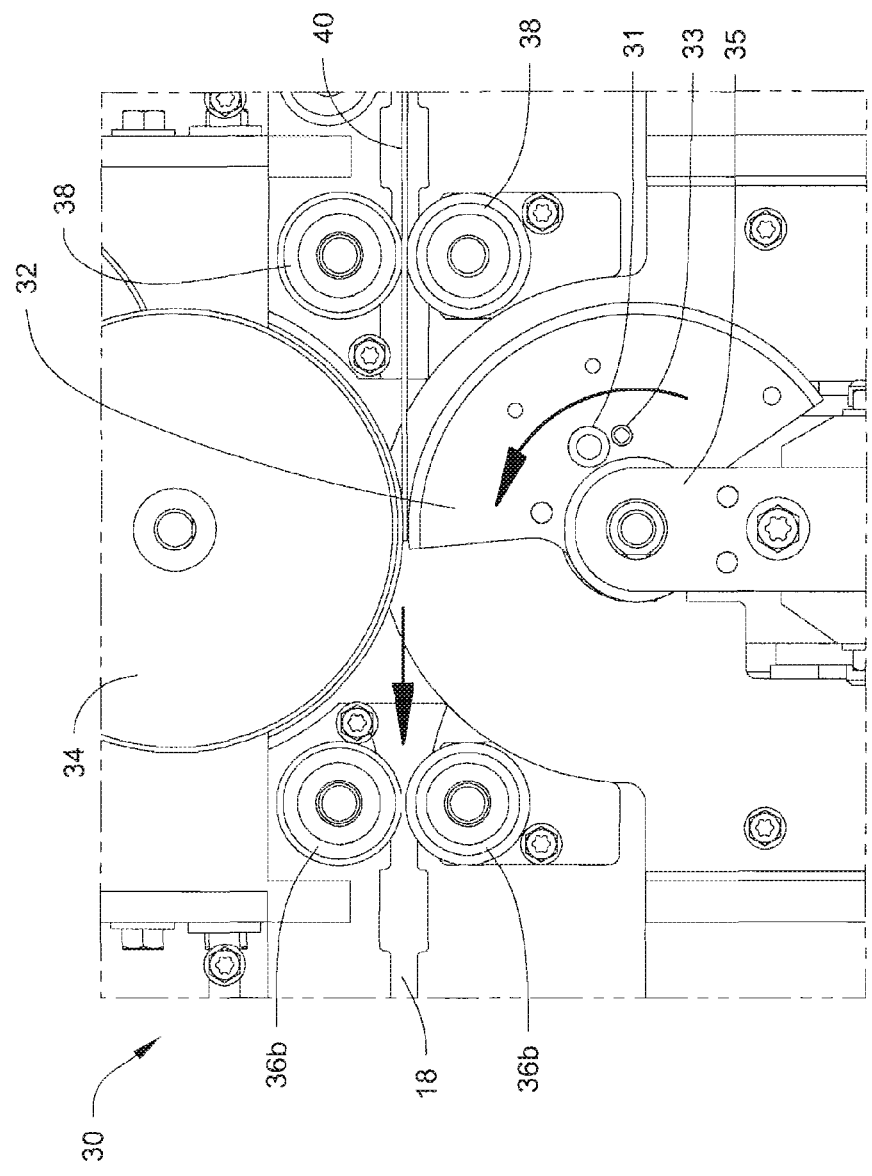

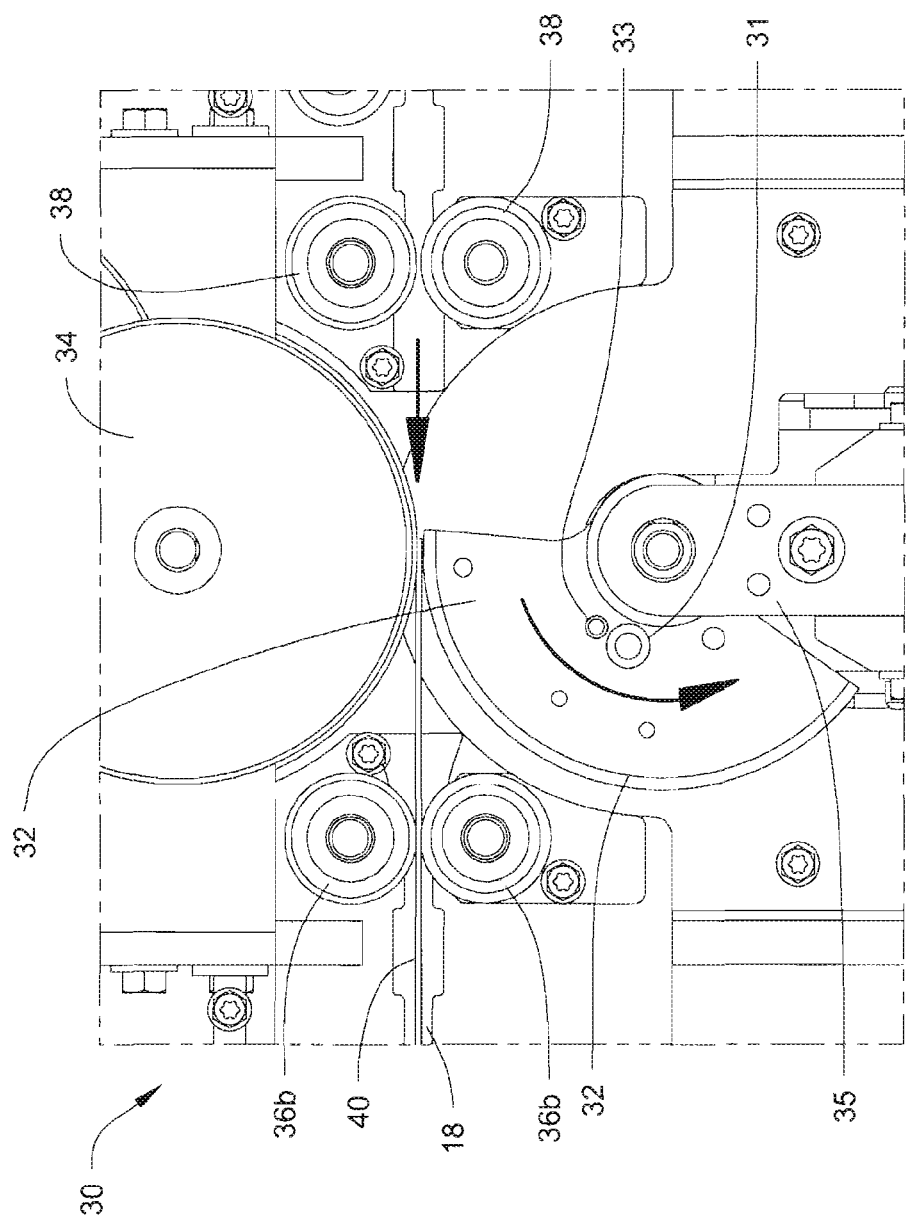

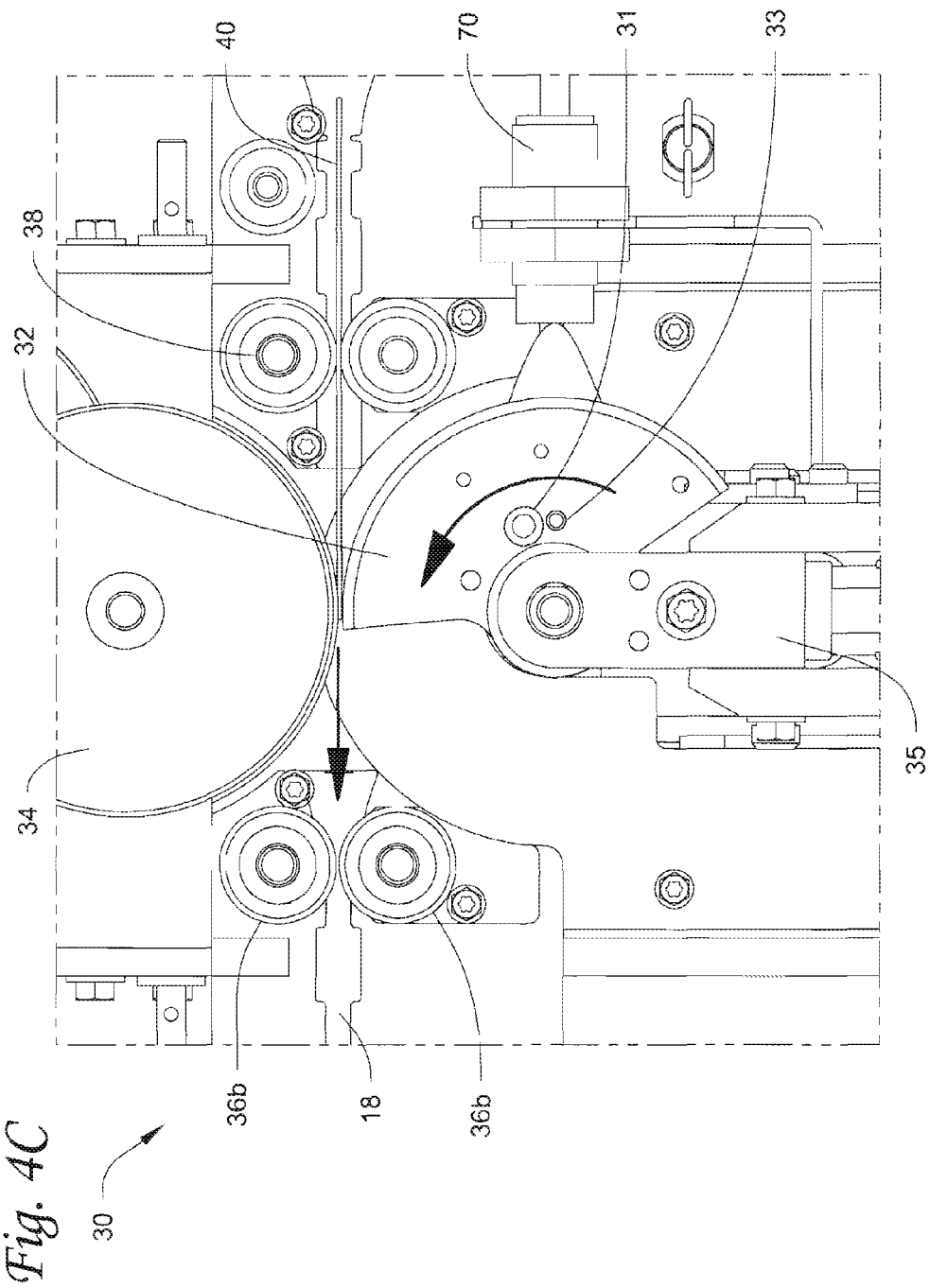

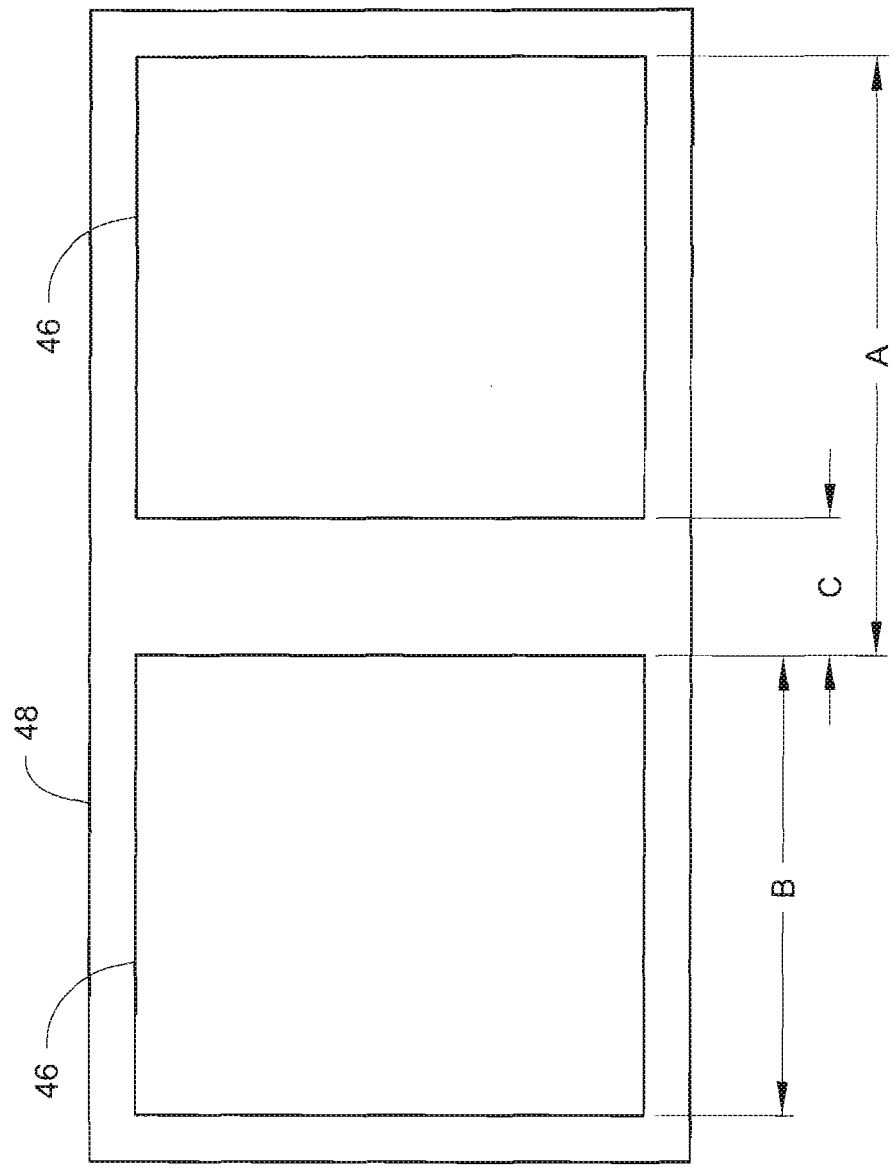

LAMINATION OF PATCH FILMS ON PERSONALIZED CARDS THROUGH HEAT TRANSFER

CROSS-REFERENCE TO RELATED APPLICATIONS

The present application claims the benefit of U.S. Provisional Patent Application Ser. Nos. 60/735,273 entitled "LAMINATION OF PATCH FILMS ON PERSONALIZED CARDS THROUGH HEAT TRANSFER," filed on Nov. 10, 2005 and 60/748,740 entitled "LAMINATION OF PATCH FILMS ON PERSONALIZED CARDS THROUGH HEAT TRANSFER," filed on Dec. 9, 2005, which are herewith incorporated by reference in their entirety.

FIELD OF THE DISCLOSURE

The technical disclosure herein relates to laminating personalized identity documents in the production thereof. Such personalized identity documents include for instance plastic cards, which may include financial (e.g. credit and debit) cards, drivers' licenses, national identification cards, and other cards which bear personalized data unique to the card holder and/or which bear other card or document information. Particularly, the technical disclosure herein relates to heat transfer lamination of a patch film in production of a personalized card.

BACKGROUND

Card personalization systems and methods used in producing personalized documents and other personalized identity documents have been employed by institutions that issue such documents. Identity documents, which are often personalized by such systems and methods, include plastic and composite cards, for instance financial (e.g. credit and debit) cards, drivers' licenses, national identification cards, and other cards and documents which are personalized with information unique to the intended document holder.

Card personalization systems and methods can be designed for small scale, individual card personalization and production. In these systems, a single card to be personalized is input into a personalization machine, which typically includes one or two personalization/production capabilities, such as printing and laminating through heat transfer.

For large volume batch production of cards, institutions often utilize systems that employ multiple processing stations or modules to process multiple cards at the same time to reduce the overall per card processing time. Examples of such systems are disclosed by DataCard Corporation of Minneapolis, Minn., in U.S. Pat. Nos. 4,825,054, 5,266,781 and its progeny, and U.S. Pat. No. 6,902,107. Common to each of these types of systems is an input with the ability to hold a relatively large number of cards that are to be personalized/produced, a plurality of personalization/production stations through which each card is directed to undergo a personalization/production operation, and an output that holds the personalized cards. A controller is typically employed to transfer data information and instructions for operating the input, the personalization/production stations, and the output. As with small scale card personalization machines, batch production systems also include heat transfer printing and laminating capabilities.

Improvements may be made upon existing personalization/production stations. Particularly, improvements may be made upon patch film lamination modules that can provide increased throughput and efficiency, while decreasing patch film price. The technical disclosure, as described hereinbelow, can provide for improved efficiency in heat transfer lamination of a patch film onto a personalized card.

SUMMARY OF THE DISCLOSURE

Generally, the present disclosure provides for lamination of personalized documents with a patch film through heat transfer. More particularly, the present disclosure provides an apparatus for and method of laminating personalized cards with a patch film by affixing a portion of a patch film onto a portion of the card prior to subjecting the entire card to lamination. The present disclosure may achieve efficient production of personalized cards by increasing throughput of laminated cards while decreasing patch film costs.

In one embodiment, an apparatus for laminating personalized cards comprises a frame that supports a supply spindle for delivering a patch film disposed on a web to a personalized card. The frame supports a platen structure for affixing a portion of the patch film to a portion of one side of the personalized card when the supply delivers the patch film to the personalized card. The frame supports a take-up spindle for receiving the web after the patch film has been delivered to the personalized card. The frame supports a lamination assembly for laminating the remaining portion of the patch film to the entire side of the personalized card having the patch film partially affixed thereto from the platen structure.

In this manner, the patch film may be first affixed by the platen structure onto a portion of one side of the personalized card before the entire patch film is laminated onto the personalized card.

In one embodiment, the platen structure includes a head portion having an end surface for contacting the patch film and pressing a portion of the patch film against the personalized card. The platen structure includes a heating element for heating the end surface, so that the portion of the patch film may affix to the portion of the personalized card when pressed against the personalized card. The platen structure may include a thermocouple for measuring the temperature of the platen structure and for monitoring the same.

In yet another embodiment, the head portion may have side surfaces that taper toward the end surface so that the end surface has a reduced surface area.

In one embodiment, the apparatus further comprises a strip pin disposed downstream of and adjacent to the platen structure proximate the end surface. The strip pin may be disposed directly adjacent to an area where the end surface of the platen structure affixes the patch film to the personalized card, so as to facilitate removal or stripping of the patch film from the web.

In one embodiment, the lamination assembly includes a lamination shoe and a backing roller for the lamination shoe to press against when a personalized card is delivered between the lamination shoe and the backing roller. The lamination shoe may be spring loaded so as to be biased in a lamination ready position. The lamination shoe can be driven into contact with the personalized card and presses the card against the backing roller. The backing roller can rotate to drive the card and rotate the lamination shoe, so as to laminate an affixed patch film to an entire side of the personalized card.

In some embodiments, the lamination shoe includes an arcuate surface having a chord length and height that is larger than the personalized card.

In other embodiments, the arcuate surface of the lamination shoe has a chord length and height that is smaller than the personalized card, but larger than the length and height of a patch film to be laminated. In this configuration, a lamination shoe is sized to laminate a portion of the personalized card that is smaller than the entire surface of the personalized card (i.e. laminating over the photograph on a driver's license).

In yet another embodiment, the lamination shoe includes a cutout portion that may correspond with a laminate sensitive area on a personalized card. In one embodiment, the corresponding laminate sensitive area may be a position on the personalized card where a smart card chip is disposed. In this manner, card processing and throughput may be increased, because the cutout portion can allow cards with laminate sensitive areas, such as smart card chips, to be processed. As the lamination shoe can be biased into a lamination ready position, delay in card processing can be reduced, because the lamination shoe may be in position to laminate the next personalized card right after processing a preceding card. In one embodiment, the apparatus may further comprise an IR thermal detector to monitor the surface temperature of the lamination shoe.

In yet another embodiment, a method for laminating personalized cards includes delivering a patch film disposed on a web material to a personalized card from a source of supply. The patch film is contacted by a platen structure at a portion of the patch film. The platen structure presses the portion of the patch film against the personalized card. The platen structure may be heated such that, when the platen structure presses the portion of the patch film against the personalized card, the portion of the patch film may affix to a portion of one side of the personalized card. After the portion of the patch film has been affixed to the personalized card, the remaining portion of the patch film is removed from the web by a stripping pin. The entire patch film is then laminated to the entire side of the personalized card by a lamination assembly.

In yet another embodiment, a patch film supply comprises a web material having a plurality of patch films disposed thereon. The web material can be arranged as a roll. The patch films on the roll of web material are configured for affixing each of the patch films to a personalized card in an apparatus for laminating personalized cards. The patch films are arranged on the web material so as to be substantially close together. In this manner, patch film spacing may be decreased on the web material. Further, the number of patches per roll of web material may be increased, which can lower patch film costs.

The present disclosure may provide advantages such that the platen structure may allow faster strip speed, which can achieve greater throughput and improved efficiency. The narrow platen structure may allow a strip pin to be closer to the affixation by the platen structure so as to be directly adjacent to the platen structure. In this manner, patch spacing on a web material may be decreased, which may increase the number of patch films per roll, thereby decreasing patch price. The heater element on the platen structure may provide a more cost effective means.

These and other various advantages and features of novelty, which characterize the inventive concepts, are pointed out in the following detailed description. For better understanding of the technical disclosure, its advantages, and the objects obtained by its use, reference should also be made to the drawings which form a further part hereof, and to accompanying descriptive matter, in which there are illustrated and described specific examples in accordance with the principles of the inventive concepts.

BRIEF DESCRIPTION OF THE DRAWINGS

Referring now to the drawings in which like reference numbers represent corresponding parts throughout:

FIG. 4A represents one embodiment of a lamination shoe for an apparatus for laminating a patch film onto personalized cards showing the lamination shoe in a state at the start of lamination.

FIG. 4B represents the lamination shoe of FIG. 4A showing the lamination shoe in a state at the end of lamination.

FIG. 4C represents on embodiment of an apparatus for laminating a patch film onto personalized cards that includes an IR thermal detector.

FIG. 8 represents a partial side view of the web material made up of a supply of patch films for use in the apparatus.

DETAILED DESCRIPTION OF THE DISCLOSURE

Figure 1:
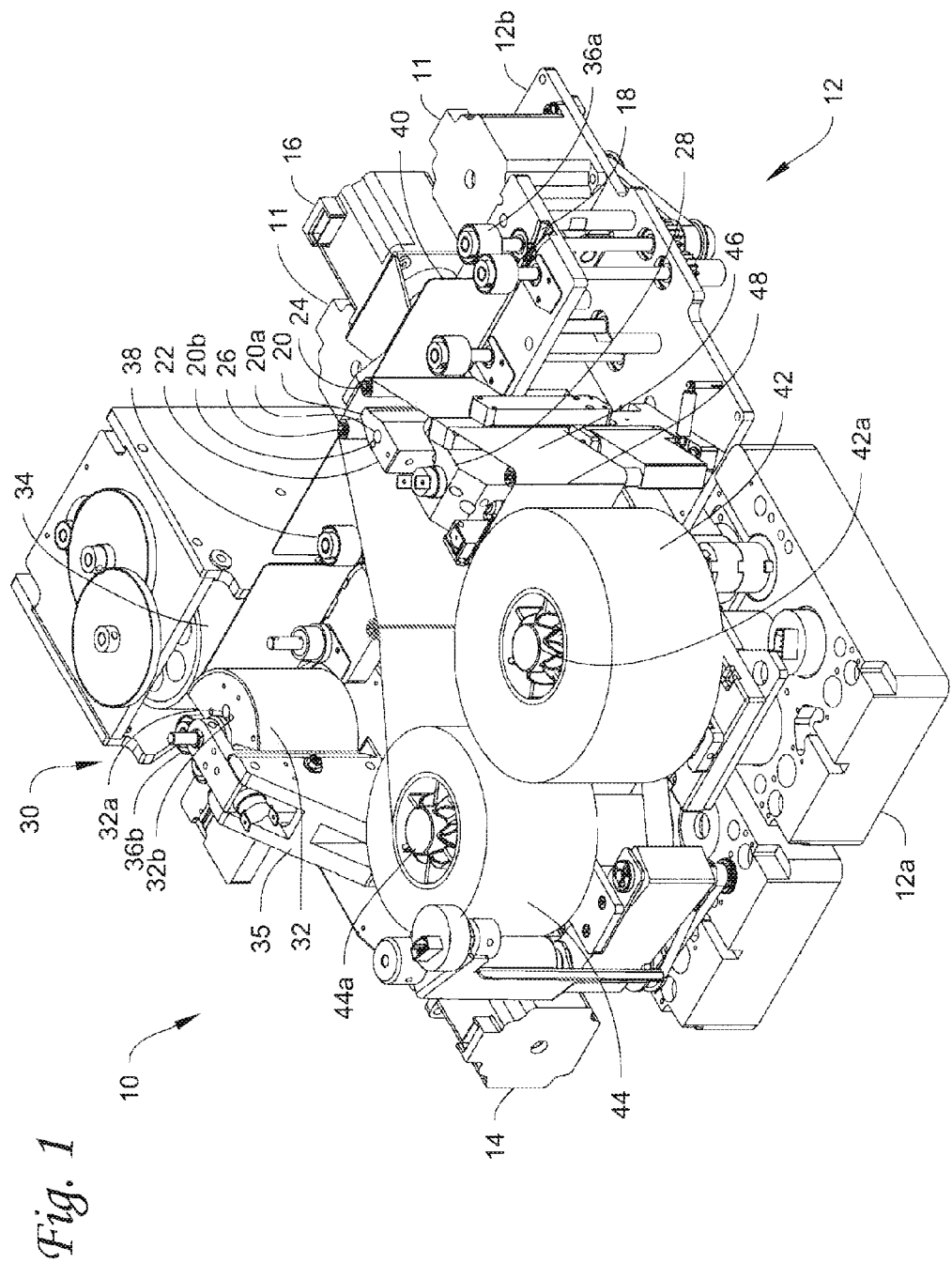
FIG. 1 represents a perspective view of one embodiment of an apparatus for laminating a patch film onto personalized cards.

FIG. 1 represents a perspective view of one exemplary embodiment of an apparatus 10 for laminating a patch film onto personalized cards.

The apparatus 10 generally includes a frame 12 having ends 12a, 12b. The frame 12 can support a supply component 42 and a take-up component 44 proximate end 12a. As one example only, the frame 12 may be provided with generally planar surfaces for supporting any components thereon, including the supply component 42 and the take-up component 44.

The supply component 42 may include a supply spindle assembly 42a for supporting a roll of web material 48 having a plurality of patch films 46 arranged thereon (patch films 46 shown in FIGS. 2A-2D). The supply spindle assembly 42a delivers the web material 48 and patch films 46 to personalized cards 40 that enter the apparatus 10. Guide pins may be employed to facilitate delivery of the web material 48 and patch films 46 to an area where affixing of the patch film 46 onto the personalized card 40 is desired. It will be appreciated that term affix may include the term tack, defined here as a temporary adhesion, such as a temporary adhesion of the patch film to the personalized card. It will also be appreciated that the term affix is non-limiting so long as at least a portion of the patch film can be placed on the personalized document.

In other embodiments, it will be appreciated that the web material is made up of a supply of patch films that are perforated such that when lamination occurs a portion of the web material corresponding to the patch film to be laminated on the personalized document is removed from where the perforation is located and is laminated on the personalized document. It will also be appreciated that the patch film is a coating or overlay on the web material that is capable of being transferred to or laminated on the personalized card.

The take-up component 44 may include a take-up spindle assembly 44a for receiving the web material 48 after patch films 46 have been delivered to a personalized card 40. The take-up spindle receives the web material 48 after a patch film 46 has been delivered to the personalized card 40 and removed from the web 48.

The frame supports a card path 18 for enabling entry and exit of a personalized card 40 to be laminated. Entry rollers 36a and exit rollers 36b further facilitate the entry and exit of a personalized card 40 for transferring the personalized card 40 downstream. The frame 12 may also include a plurality of bolt holes for attaching the apparatus 10 to a card processing system (not shown). The apparatus 10 can be powered and controlled, through any means known in the art, and can be operated through a number of motors. As one example, the frame supports at least one motor 11 for driving the rollers. A motor 16 may drive a platen structure 20 and a motor 14 may drive a lamination assembly, of which the platen structure 20 and lamination assembly 30 are further described hereinafter.

The frame supports a platen structure 20 for affixing a portion of the patch film 46 to a portion of one side of the personalized card 40 when the supply component 42 delivers the patch film 46 to the personalized card 40. The platen structure 20 is movable to and from the card path 18, and may be disposed between delivery of the web material 48 and patch film 46 from the supply component 42 to the personalized card 40 and take-up of the web material 48 by the take-up component 44. It will be appreciated that the term platen structure is construed broadly to include any structure having a surface for exerting or receiving pressure on a planar surface, such as the surface of a personalized card. It will be also be appreciated that the term portion of the patch film may mean a part that is less than the entire patch film, and that the term portion of one side of the personalized card may mean a part that is less than the entire surface of one side of the personalized card.

In one embodiment, the platen structure 20 includes a head portion 22 having an end surface 20d (best shown in FIGS. 2A-2B) for contacting the patch film 46 and pressing a portion of the patch film 46 against the personalized card 40. The platen structure 20 may press the patch film 46 against the personalized card when the supply component 42 delivers the web material 48, having the patch film arranged thereon, between the platen structure 20 and the personalized card 40. The platen structure 20 can move towards and away from the card path 18. Movement of the platen structure 20 will be further described below.

The head portion 22 of the platen structure 20 can include a space or hole 20a therein for supporting a heating element 21 (best shown in FIG. 3) for heating the end surface 20d. By heating the end surface 20d with the heating element 21, a portion of the patch film 46 can be affixed to a portion of the personalized card 40 when pressed against the personalized card 40. The portion of the patch film 46 that affixes to the personalized card 40 can be a lead portion (best shown in FIGS. 2B-2C). The portion of the personalized card 40 that the lead portion of the patch films affixes to can be a lead portion of the personalized card 40. The lead portion of the personalized card 40 may be about a 0.25 inch (about 6.35 mm) leading edge of the personalized card 40. The heating element 21 can heat the lead portion of the patch film 46 to about 300° F. (about 148.89° C.) for affixing the portion of the patch film to the lead portion of the personalized card.

The platen structure 20 may include a space or hole 20b therein for supporting a thermocouple element 23. The thermocouple element can measure the temperature of the platen structure 20, particularly the end surface 20d, and can facilitate monitoring of the same.

In yet another embodiment, the head portion 22 may include a tapered portion 20c along side surfaces thereof. The tapered portion 20c tapers toward the end surface 20d so that the end surface 20d has a reduced surface area (best shown in FIGS. 2A-2B). In this configuration, the force of the platen structure 20 may be concentrated in a reduced or narrowed surface area to better facilitate affixing the portion of the patch film 46 to the personalized card 40. The reduced surface area of the end surface 20d can also allow a strip pin (described below) to be disposed closer to the platen affixing process. This configuration may help to achieve decreased patch film spacing on a roll of web material, so as to increase the number of patch films that may be supported on a roll of web material and lower costs for patch films.

Figure 2A:
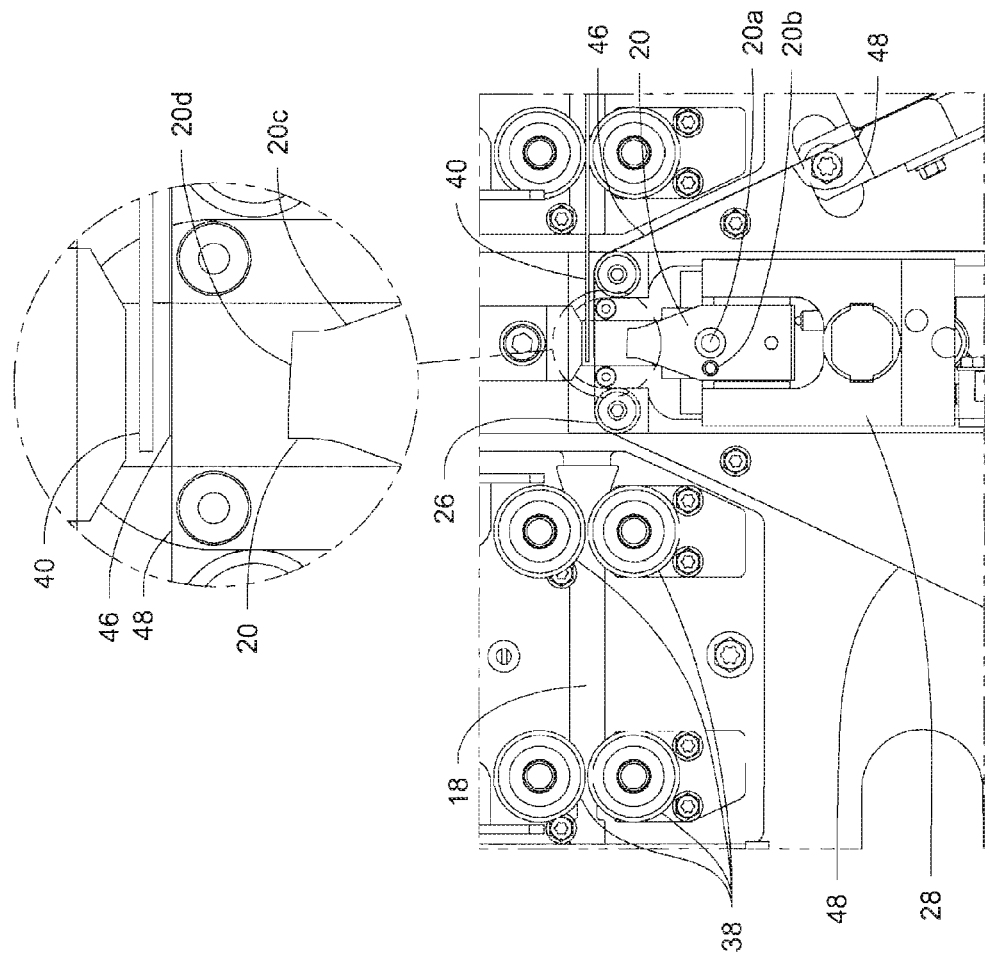
FIG. 2A represents a partial top view of the apparatus of FIG. 1 showing one embodiment for a platen structure and a personalized card in a state before affixing of a patch film.
Figure 2B:
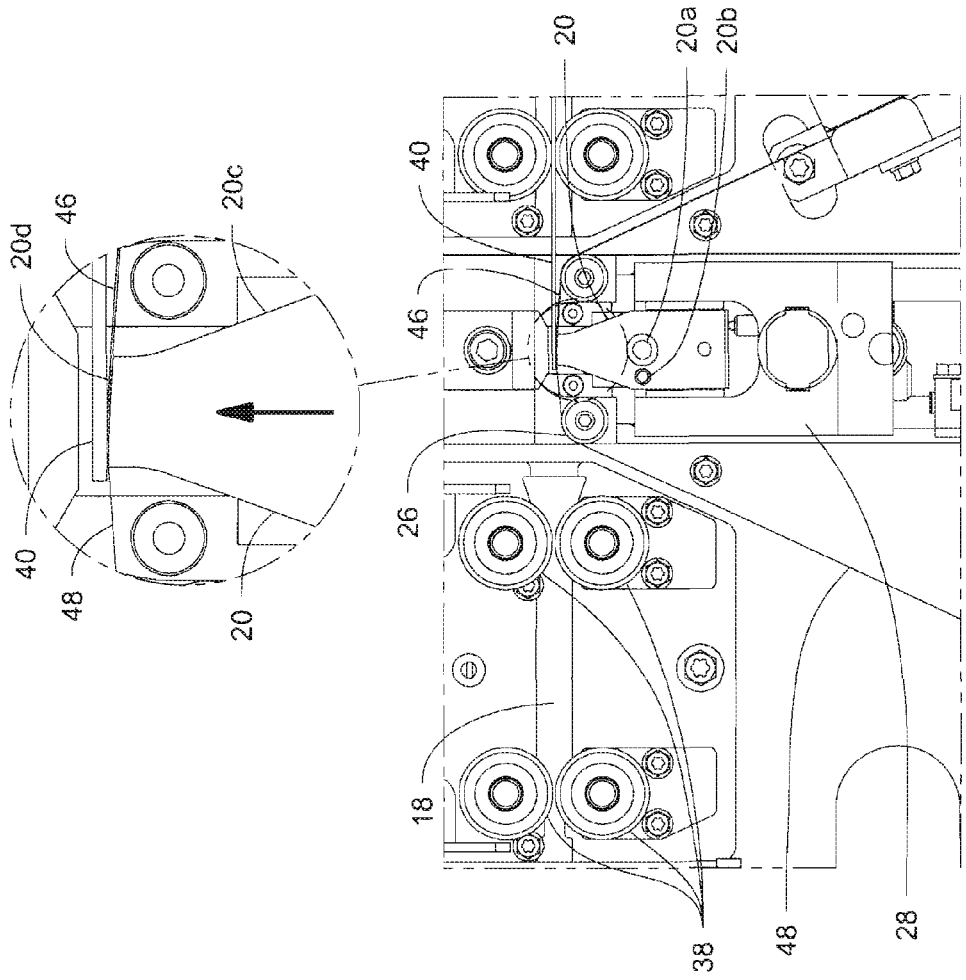
FIG. 2B represents a partial top view of the apparatus of FIG. 1 showing the personalized card in a state during affixing of a portion of a patch film.

The end surface 20d may also be a substantially planar surface. It will be appreciated that the end surface 20d can be construed broadly to include any suitable surface for exerting or receiving pressure on a planar surface, such as the surface of a personalized card. The end surface may also be configured as a slightly radiused surface. As best shown in FIGS. 2A-2B, the end surface 20d may be radiused from a leading/downstream end to a trailing/upstream end, where the leading end is substantially planar and the trailing end is slightly arcuate or curved. In this manner, the pressure exerted by the end surface 20d on a personalized card during affixing can be distributed in a decreasing fashion from the lead most portion of the card.

As mentioned above, the apparatus 10 may further comprise a strip pin 26 disposed downstream of and adjacent to the platen structure 20. The strip pin 26 is proximate the end surface 20d and the tapered portion 20e, such that the strip pin 26 may be disposed directly adjacent to the platen structure 20. In this configuration, removal of the patch film 46 from the web material 48 can be facilitated.

The platen structure 20 may be moved towards and away from the card path 18 through a platen support 28. The platen support 28 imparts movement to the platen structure and may be moved by any suitable means known in the art. As one example, the platen structure 20 may be moved through electrical power and control. As shown in FIG. 1, the platen structure 20 may be operatively connected with and electrically driven by a motor 16.

Figure 6A:
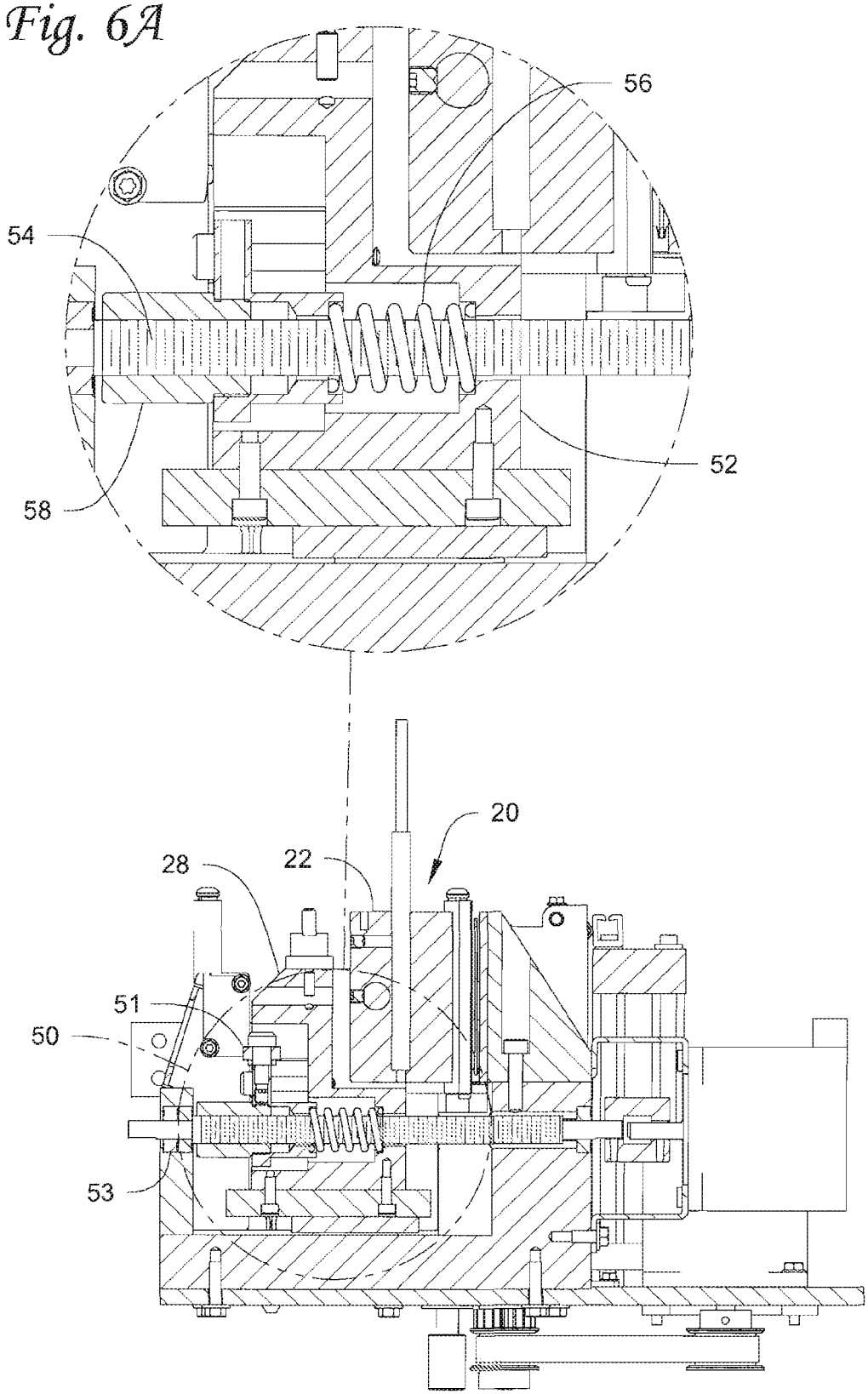
FIG. 6A represents a partial side sectional view of the apparatus of FIG. 1 showing one embodiment of a drive and compression mechanism for driving a platen structure before affixing of a patch film to a personalized card.
Figure 6B:
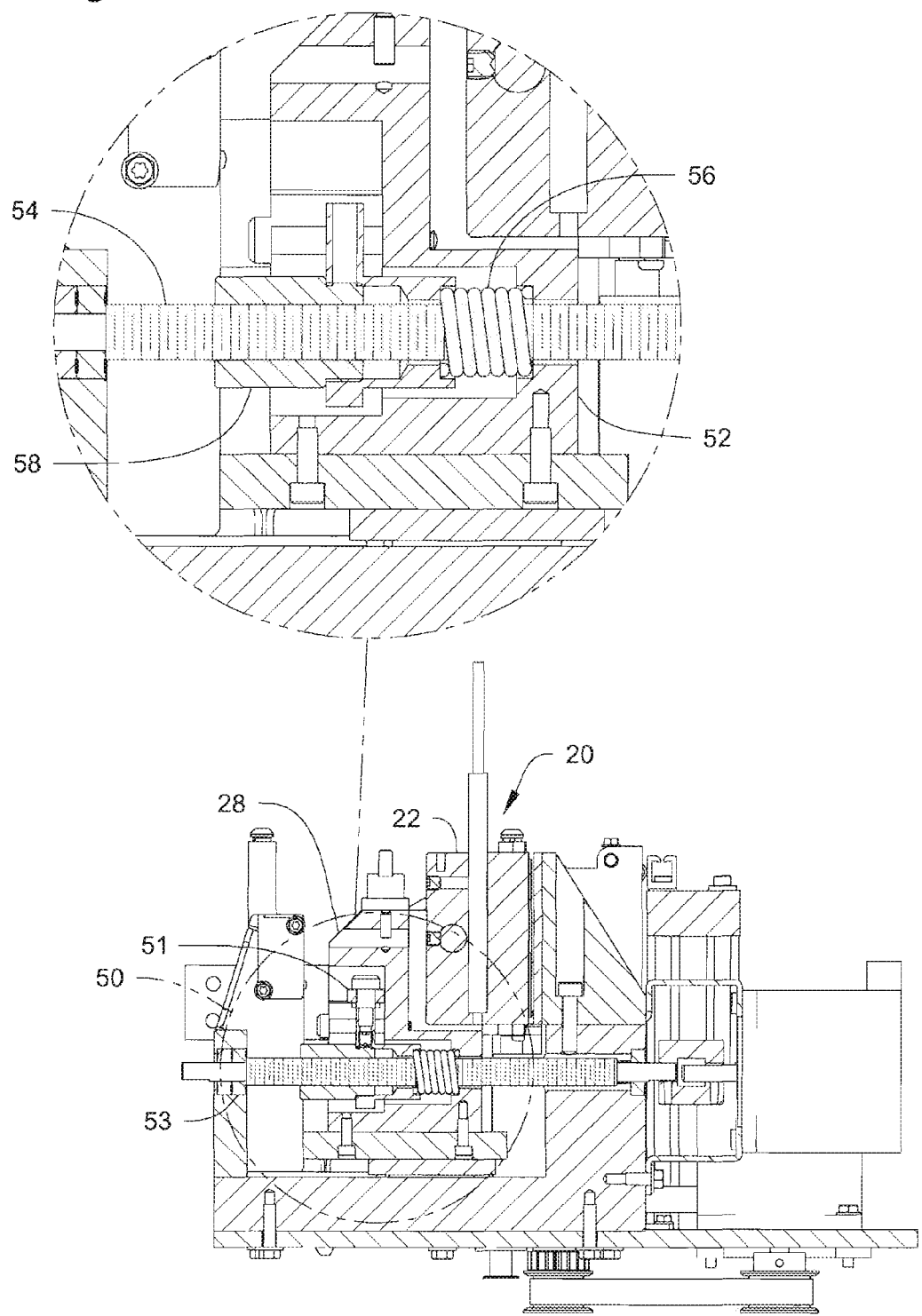
FIG. 6B represents a partial side sectional view of the apparatus of FIG. 1 showing one embodiment of a drive and compression mechanism for driving a platen structure during affixing of a patch film to a personalized card.

FIGS. 6A and 6B illustrate a platen support 28 for the platen structure 20, which includes a drive and compression mechanism 50 for moving the platen structure 20 before and during affixing the patch film 46 to the personalized card 40. The mechanism 50 can provide both driving and load compression functions, and may provide both functions simultaneously during affixing (see FIG. 6B). The mechanism 50 includes a support block 52. The support block 52 supports a ball screw 54 that can be inserted through the support block 52. A ball screw nut 58 may be used to secure the ball screw 54 with the support block 52. A compression spring 56 may be disposed about the ball screw 54. As shown, the compression spring 56 may be longitudinally disposed around a portion of the ball screw 54.

In operation, the ball screw 54 may be turned to advance the platen structure 20 to the card 40. While the platen structure 20 advances the compression spring 56 may compress to a desired pressure. An anti-rotate bearing 51 and load thrust bearing 53 may be employed to adjust the compressive load of the compression spring 56. The thrust load bearing 53 may be a well known ball bearing. The ball screw 54 may include a shoulder, that when loaded, transmits the load to an inner race of the thrust load bearing. An outer race of the load thrust bearing 53 can be mounted against a shoulder in a bearing block which transmits the load to the mechanism 50. As the load is applied by rotating the screw 54, a tendency may be for a ball nut to rotate with the ball screw, making it unable to load the spring. To remove this tendency, the anti-rotate bearing 51 may be added, which includes a ball nut mount and a capture screw. Clearance may be provided so the anti-rotate bearing 51 and ball nut mount are able to move in an axis parallel to the ball screw 54, but may be captured on the sides preventing the ball nut, ball nut mount and anti-rotate bearing from rotating about the same axis. In such a configuration, compression of the load spring can be enabled, without loss by a tendency of reverse rotation of the ball nut. A capture screw may also be employed hold the anti-rotation elements, so as to prevent separation of the elements when reversing the load.

It will be appreciated that the mechanism 50 is merely exemplary, and that other configurations for advancing the platen structure 20 and applying a compressive load may be equally or more suitable.

Figure 3:
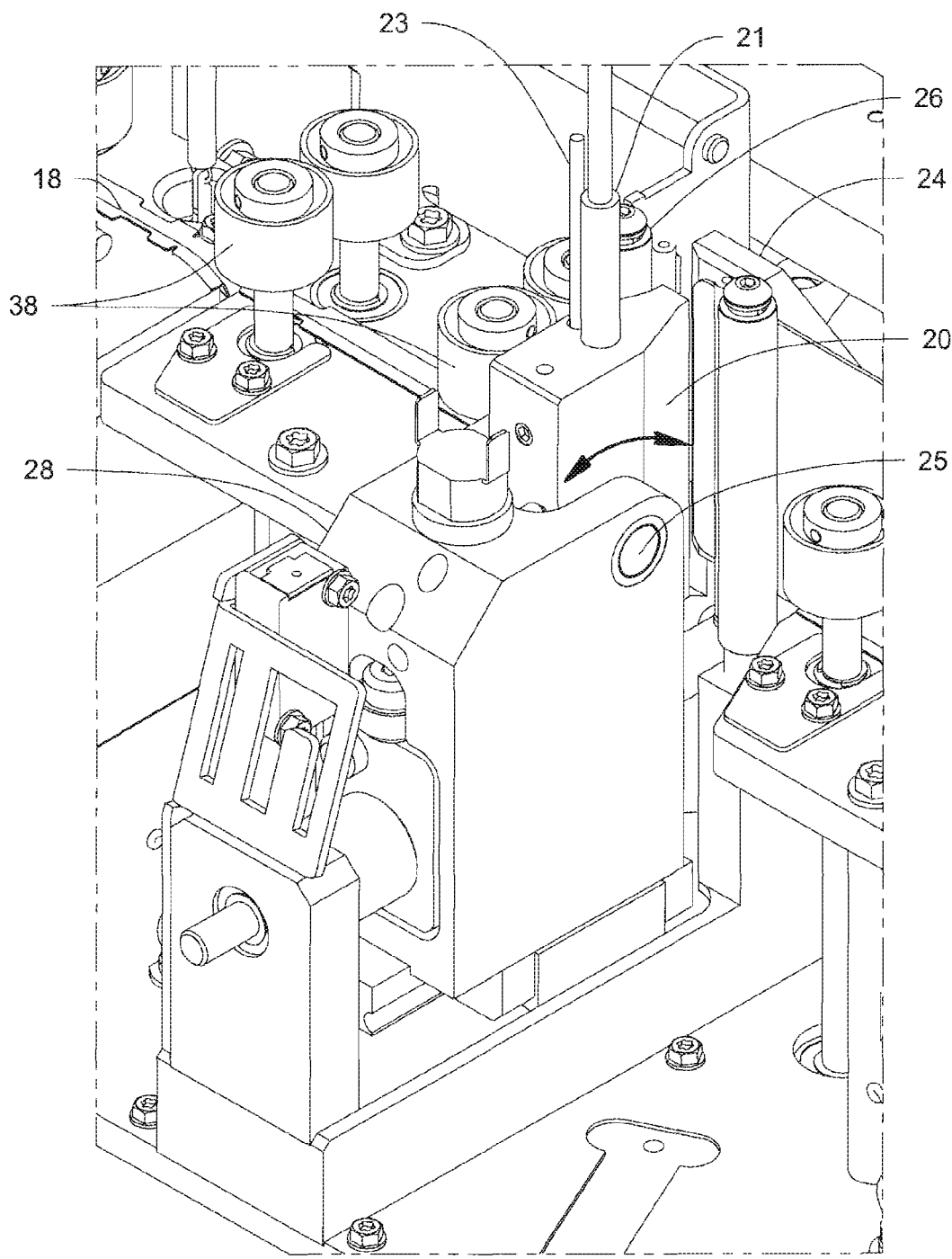
FIG. 3 represents a partial perspective view of one embodiment of the apparatus of FIG. 1 showing one embodiment of a platen structure having one embodiment of a gimbaled configuration.

In one embodiment, FIG. 3 represents a partial perspective view showing one embodiment of a platen structure 20 having a gimbaled configuration. That is, the platen structure 20 can be pivotable with respect to the platen support 28. The pivot support 28 includes a pivot point 25, whereby a shaft may be inserted through the body of the platen support 28 and the head portion 22 of the platen structure 20. The pivot point 25 enables the platen structure 20 to be pivotably supported on the platen support 28. In this configuration, the platen structure 20 may be pivoted along a horizontal axis (direction of arrow illustrated) such that the platen structure 20 may better facilitate pressing the patch film 46 against the personalized card 40. It will be appreciated that a gimbaled configuration will be construed broadly to include a configuration for freely inclining or declining the platen structure 20 in a pivoting direction.

It will be appreciated that the pivot configuration for the platen structure, as shown, is exemplary only. The platen structure may be pivoted by any suitable means known in the art. Preferably, the platen support 28 and pivot point 25 should be construed broadly as simply requiring any means for pivoting the platen structure 20 against the patch film 46 and personalized card 40.

The frame 12 may further support a backing plate 24. The backing plate may be a gusset or any suitable reinforcement structure that is disposed opposite the platen structure 20. That is, the backing plate 24 may be disposed on the other side of the card path 18. The backing plate can provide a support surface when the platen structure presses the portion of the patch film 46 onto the personalized card 40.

The frame 12 supports intermediate rollers 38. The intermediate rollers 38 may be idling rollers that help keep the patch film and personalized card 40 together during transfer to the lamination assembly 30 (described hereinafter). That is, after the portion of the patch film 46 is affixed to the portion of the personalized card 40, a remaining portion of the patch film 46 that is to be laminated by the lamination assembly 30 may need to be held together until lamination has been completed. The intermediate rollers 38 can achieve this effect by helping to keep the patch film 46 and personalized card 40 together prior to lamination.

Figure 4D:
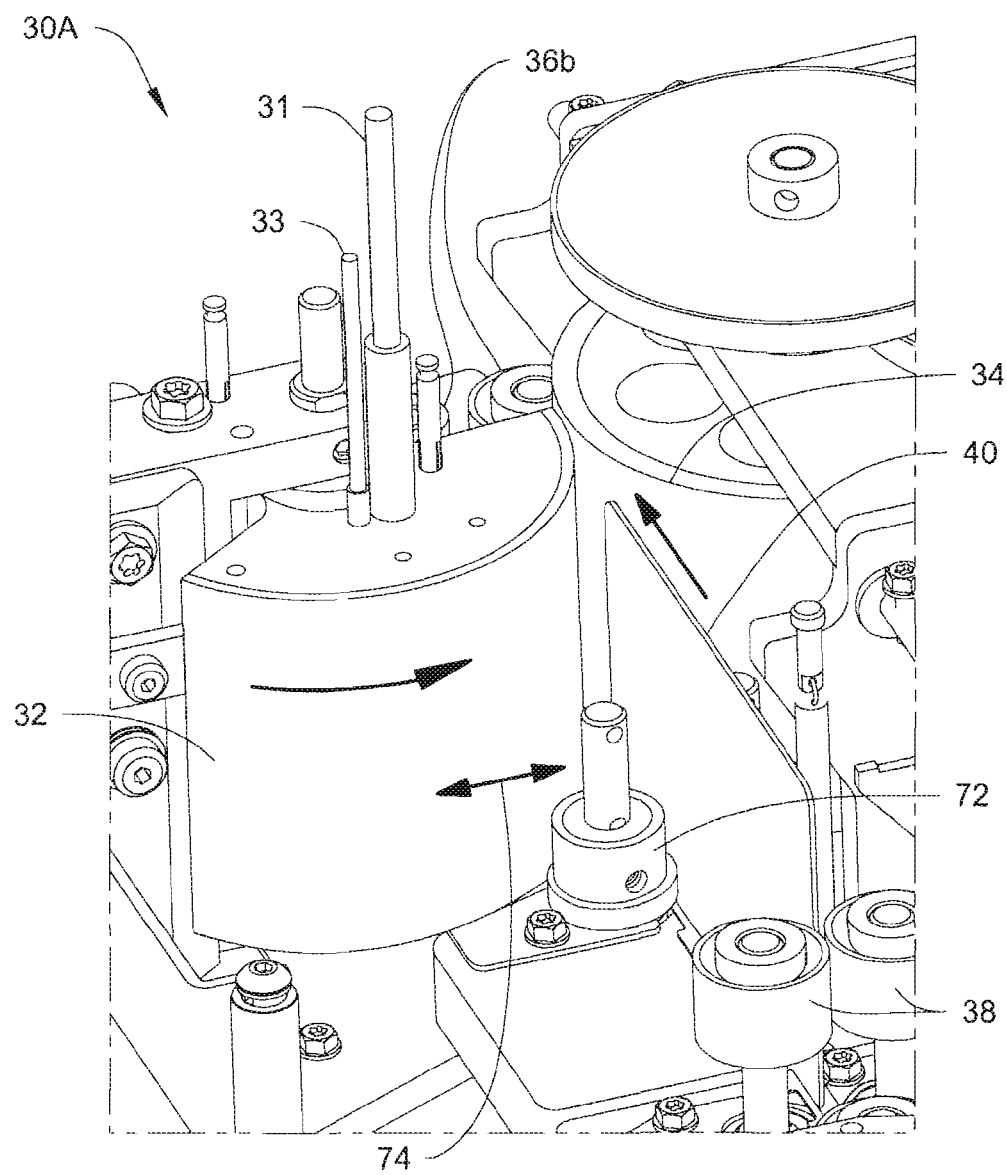
FIG. 4D represents one embodiment of an apparatus for laminating a patch film onto personalized cards that includes a movable roller.

FIGS. 4A-4D illustrate an exemplary embodiment for a lamination assembly 30. The lamination assembly includes a lamination shoe 32 supported by the frame 12 and a backing roller 34 for the lamination shoe 32 to press against when a personalized card 40 is delivered between the lamination shoe 32 and the backing roller 34. The lamination shoe 32 may be supported on the frame 12 by a support 35 and can be rotatable with respect to the support 35 and frame 12. The lamination shoe 32 may be spring loaded so as to be biased in a lamination ready position (as shown in FIG. 4A). In operation, the lamination shoe 32 can be driven into contact with the personalized card 40 and press the card 40 against the backing roller 34. The backing roller 34 rotates to drive the card 40 and imparts rotation on the lamination shoe 32, so as to laminate an affixed patch film to an entire side of the personalized card 40. That is, the backing roller 34 can further drive and rotate the lamination shoe 32, when the lamination shoe contacts and presses the patch film on the personalized card 40 and against the backing roller 34.

In this configuration, the lamination assembly 30 drives and rotates the lamination shoe 32 to press the patch film 46 onto the personalized card 40. Lamination contact and pressure may be made when a ball screw turns to advance the lamination shoe 32 to the personalized card 40 against the backing roller (best shown in FIGS. 7A-7B discussed below). As the lamination shoe 32 continues to advance, a spring may be compressed to a desired pressure. The backing roller 34 may then rotate to drive the card 40 and rotate the lamination shoe 32 until the entire patch film 46 is laminated to the card 40. In this configuration, lamination of the entire patch film 46 to an entire side of the personalized card 40 can be finalized.

In one embodiment, the lamination assembly 30 includes heat transfer capability to facilitate laminating the entire patch film 46 onto the personalized card 40. The lamination shoe 32 may be heated. The lamination shoe 32 may include a space or hole 32a for supporting a heating element 31 for heating lamination shoe 32. By heating the lamination shoe 32 with the heating element 31, the patch film 46 can be laminated to the personalized card 40. The heating element 31 can heat the lamination shoe 32 to about 410° F. (210° C.).

In some embodiments the lamination assembly may further include an IR thermal detector 70 that is configured to monitor the surface temperature of the lamination shoe (shown in FIG. 4C). One advantage of using an IR thermal detector 70 as opposed to a thermocouple to monitor temperature of the lamination assembly is that the IR thermal detector 70 requires less moving wires within the assembly.

The lamination shoe 32 may include a space or hole 32b therein for supporting a thermocouple element 33. The thermocouple element can measure the temperature of the lamination shoe 32, and can facilitate monitoring of the same.

FIG. 4A represents the lamination shoe 32 in a state at the start of lamination. FIG. 4B represents the lamination shoe 32 in a state at the end of lamination. In one embodiment, the lamination shoe 32 includes an arcuate surface having a chord length that is longer than a length of a personalized card 40. In this manner, the lamination shoe 32 can assure contact against the entire card 40 when pressing the patch film 46 against it to laminate the patch film 46 on the personalized card 40. One embodiment, the lamination shoe 32 includes generally a half circle that is biased back to the ready position each time a card is to be laminated. In this manner, the lamination shoe is in the correct position to align with, for instance a smart card chip.

Figure 2C:
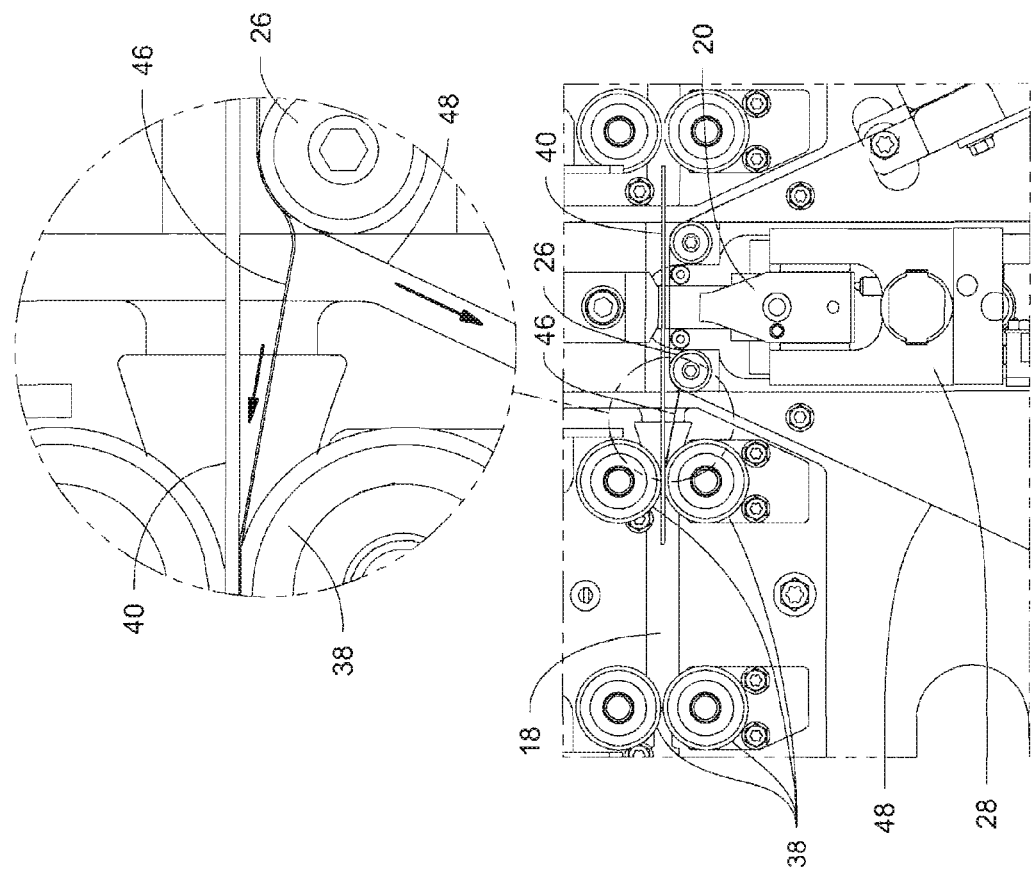
FIG. 2C represents a partial top view of the apparatus of FIG. 1 showing the personalized card after a portion of the patch film has been affixed to the personalized card and during stripping of the patch film from a supply web.
Figure 2D:
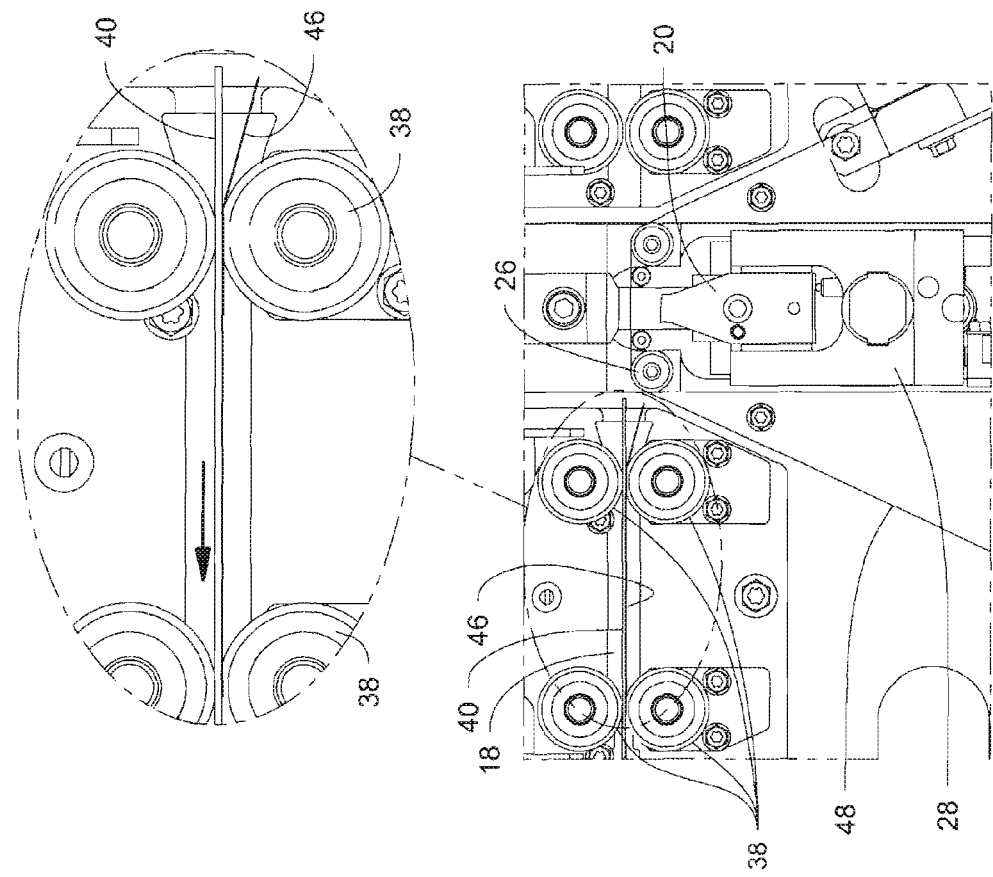
FIG. 2D represents a partial top view of the apparatus of FIG. 1 showing the personalized card after stripping of a patch film from a supply web.

FIGS. 2A through 2D illustrate the apparatus 10 in operation. Like reference numerals represent like features already described. FIG. 2A represents the platen structure 20 and the personalized card 40 in a state before affixing of a patch film 46. FIG. 213 represents the personalized card 40 in a state during affixing of the patch film 46. FIG. 2C represents the personalized card 40 after affixing of the patch film 46 and during stripping of the patch film 46 from the web material 48. FIG. 2D represents personalized card 40 after stripping of the patch film 46 from web material 48 and being secured and transferred by the intermediate rollers 38.

FIG. 4D illustrates another embodiment for a lamination assembly 30A. Personalized card 40 is secured and transferred by the intermediate rollers 38 and a movable roller 72. The movable roller 72 may be independently driven to move in the direction of arrow 74. The adjustment of the movable roller 72 allows the lamination assembly to laminate the personalized card 40 with patch films 46 (best shown in FIGS. 2A and 2B) of varying thicknesses. Adjustment of the movable roller 72 can also prevent wrinkles from being formed by the lamination of the patch film 46 on the personalized card 40 by removing the surface restriction caused by the contact of the movable roller 72 on the surface of the patch film 46, thereby facilitating the patch film 46 to move and flex freely during the lamination.

Figure 5:
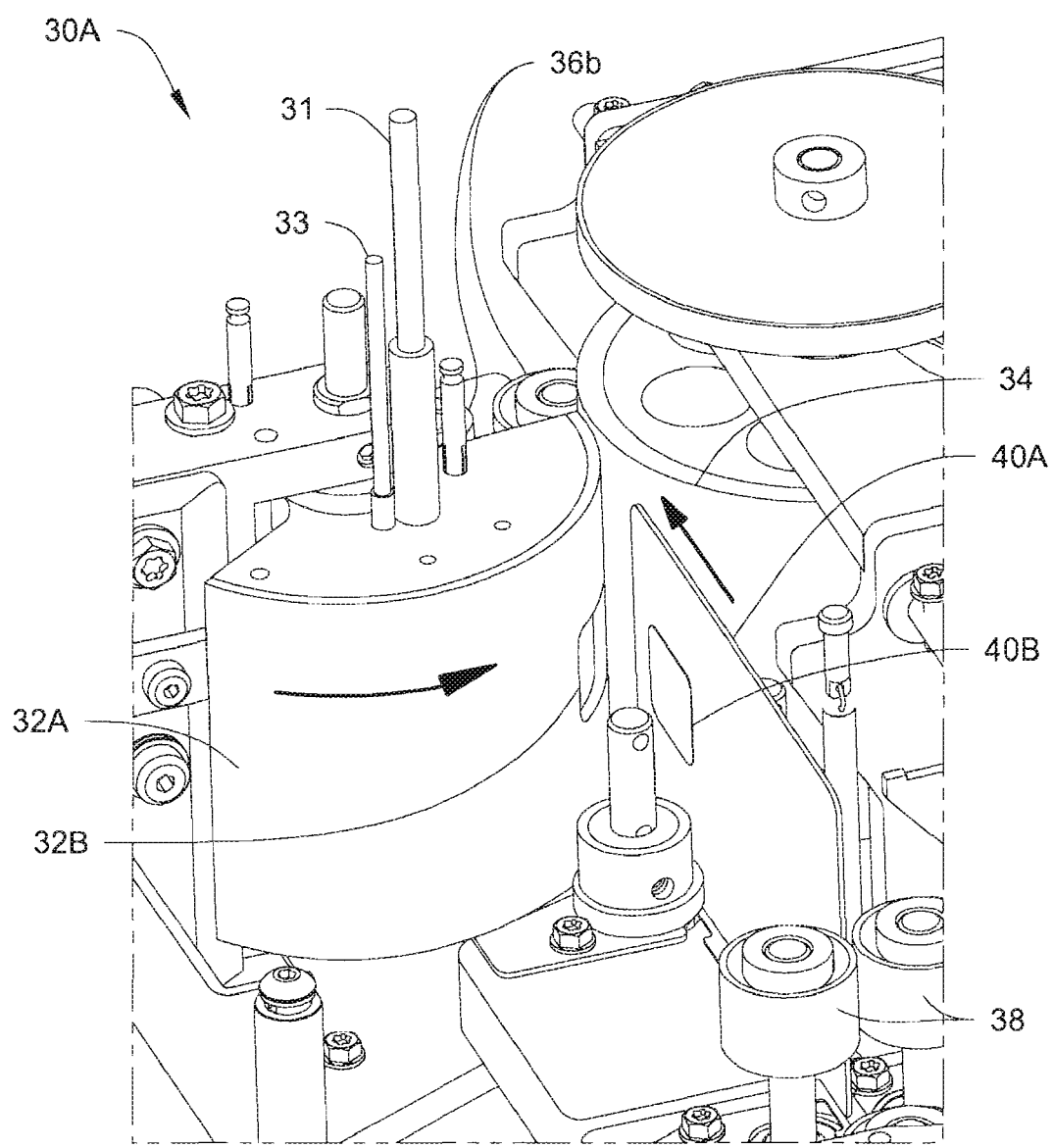
FIG. 5 represents one embodiment of a lamination shoe for an apparatus for laminating a patch film onto personalized cards and showing one embodiment of a cutout therein.

FIG. 5 illustrates another embodiment for a lamination assembly 30A. The lamination assembly may include a lamination shoe 32A. Like reference numerals represent like features already described. The lamination shoe 32A includes a cutout portion 32B that may correspond with a laminate sensitive area 40B on a personalized card 40. In one embodiment, the corresponding laminate sensitive area may be a smart card chip disposed on a personalized card 40A. The cutout portion 32A may enable such personalized cards 40A having a laminate sensitive area 40B to be transferred through without compromising the laminate sensitive area 40B, such as a smart card chip.

Figure 7A:
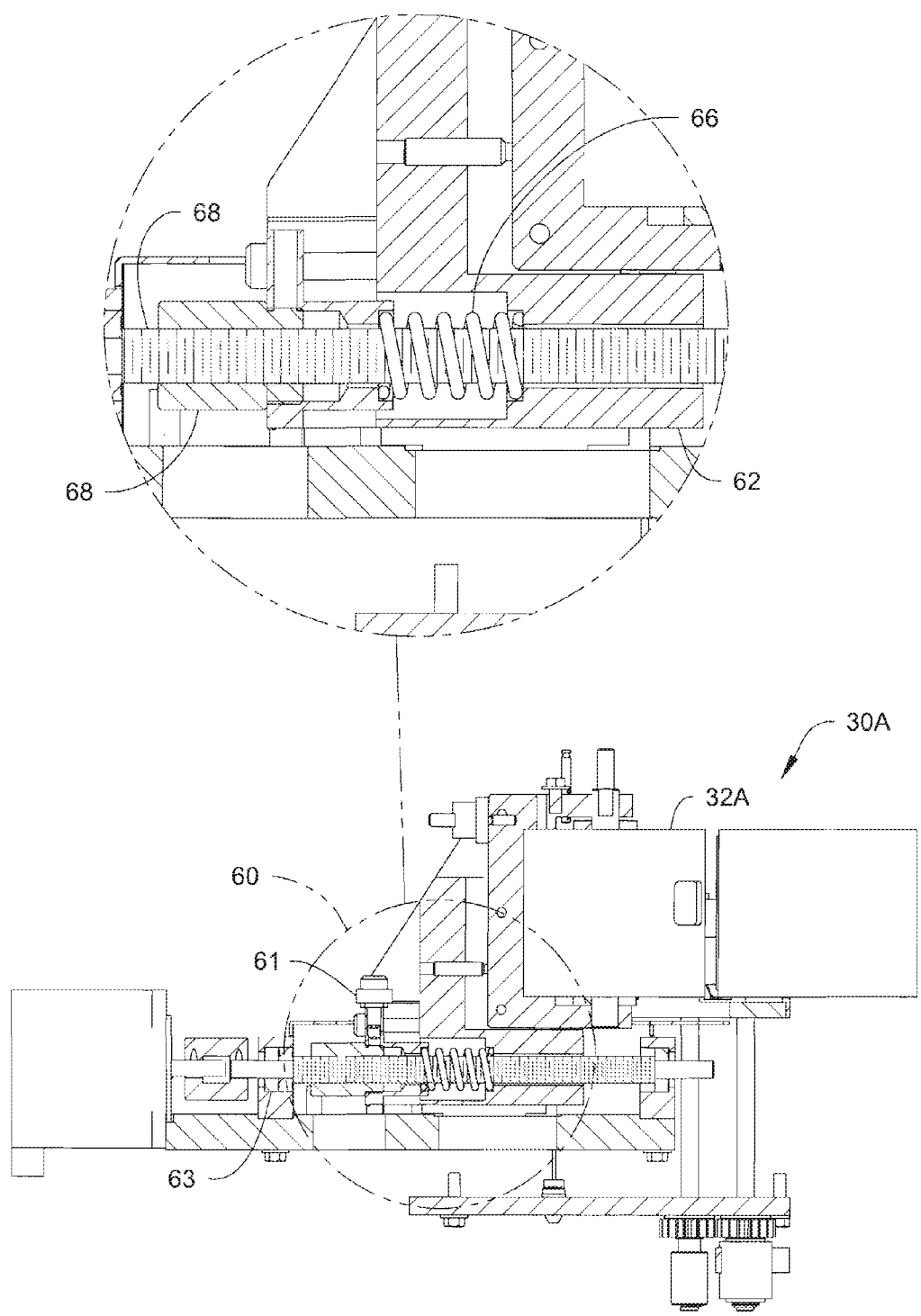
FIG. 7A represents a partial side sectional view of the apparatus of FIG. 1 showing one embodiment of a drive and compression mechanism for driving the lamination shoe of FIG. 5 before lamination.
Figure 7B:
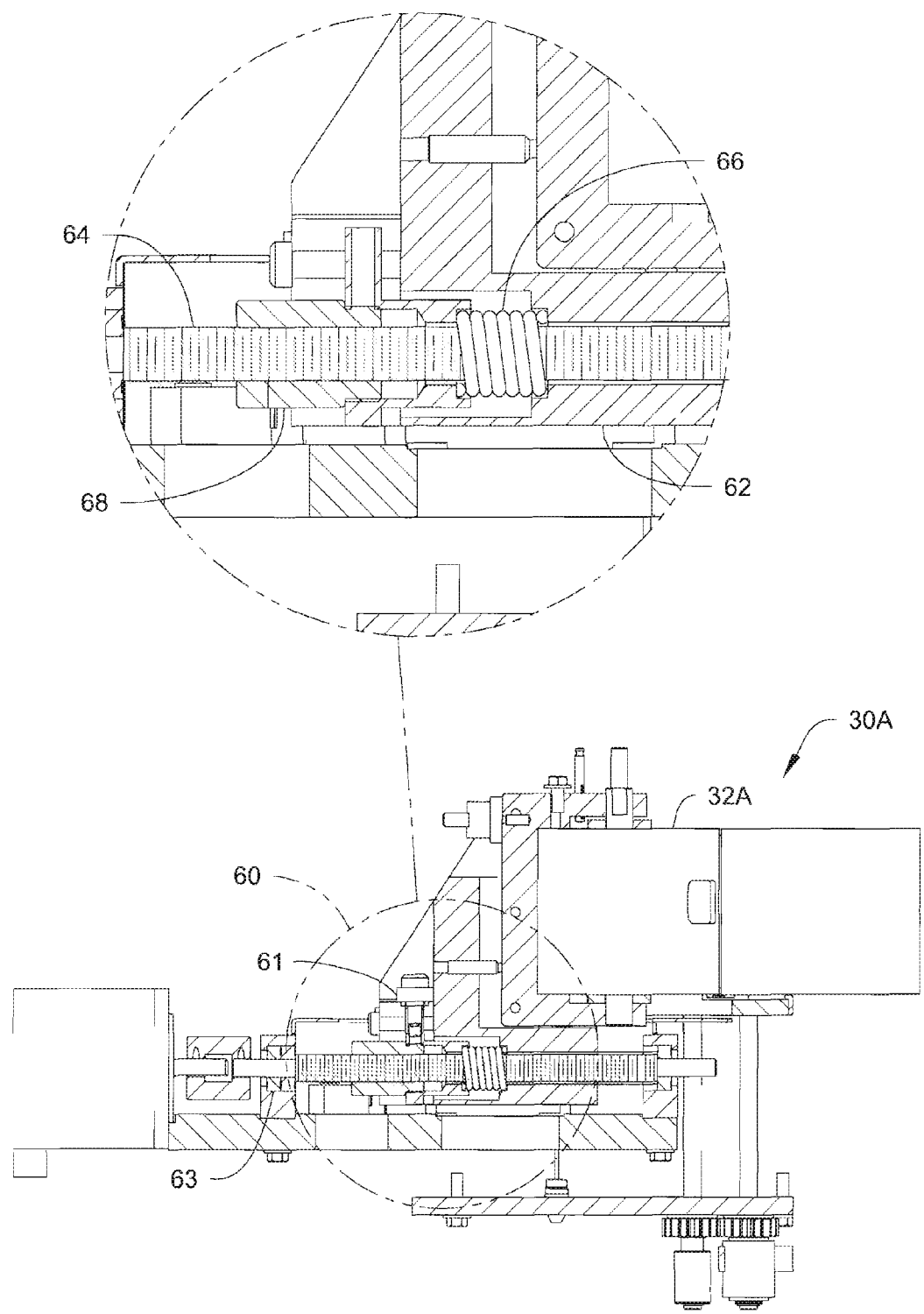
FIG. 7B represents a partial side sectional view of the apparatus of FIG. 1 showing one embodiment of a drive and compression mechanism for driving the lamination shoe of FIG. 5 during lamination.

FIGS. 7A and 7B illustrate the lamination assembly 30A of FIG. 5, which includes a mechanism 60 for moving the lamination shoe 32A before and during lamination of the entire patch film 46 to the personalized card 40. As with mechanism 50 for the platen structure shown in FIGS. 6A-B, the mechanism 60 may provide both driving and load compression functions, and may provide both functions simultaneously during lamination. The mechanism 60 includes a support block 62. The support block 62 supports a ball screw 64 that can be inserted through the support block 62. A ball screw nut 68 may be used to secure the ball screw 64 with the support block 62. A compression spring 66 may be disposed about the ball screw 64. As shown, the spring 66 may be longitudinally disposed around a portion of the ball screw 64.

In operation, the ball screw 64 turns to advance the lamination shoe 32A to the personalized card 40 against the backing roller 34. As the lamination shoe 32A continues to advance, the compression spring 66 may be compressed to a desired pressure. The backing roller 34 may then rotate to drive the card 40 and rotate the lamination shoe 32A until the entire patch film 46 is laminated to the card 40. In this configuration, lamination of the entire patch film 46 to an entire side of the personalized card 40 can be finalized. As with the mechanism 50 for moving the platen structure above, an anti-rotate bearing 61 and load thrust bearing 63 may also be employed to adjust the compressive load of the compression spring 66.

It will be appreciated that the mechanism 60 is merely exemplary, and that other configurations for advancing the platen structure 20 and applying a compressive load may be equally or more suitable.

A method for laminating personalized cards includes delivering a patch film disposed on a web material to a personalized card from a source of supply. The patch film is contacted by a platen structure at a portion of the patch film. The platen structure presses the portion of the patch film against the personalized card. The platen structure may be heated such that, when the platen structure presses the portion of the patch film against the personalized card, the portion of the patch film may affix to a portion of one side of the personalized card. After the patch film has been partially affixed to the personalized card, the remaining portion of the patch film is removed from the web by a stripping pin. The entire patch film is then laminated to the entire side of the personalized card through the lamination assembly. FIG. 8 shows an exemplary configuration of the patch film on a web material.

In yet another embodiment, a patch film supply comprises a web material having a plurality of patch films disposed thereon. It will be appreciated that the patch film 46 as described may be any material capable of being laminated onto a personalized card, and having detail printed thereon prior to lamination onto a personalized card. The patch film may also be constructed to include a smart card chip thereon. The web can be arranged as a roll of web material. The patch films on the roll of web material are configured for laminating each of the patch films to a personalized card in an apparatus for laminating personalized cards. The patch films are arranged on the web material so as to be substantially close together.

In some embodiments, the lamination shoe includes an arcuate surface having a chord length and height that is larger than the personalized card.

In other embodiments, the arcuate surface of the lamination shoe has a chord length and height that is smaller than the personalized card, but larger than the length and height of a patch film to be laminated. In this configuration, a lamination shoe is sized to laminate a portion of the personalized card that is smaller than the entire surface of the personalized card (i.e. laminating over the photograph on a driver's license).

The patch films 46 are configured on the web material 48 for delivery to a personalized card in an apparatus such as apparatus 10, where a mechanism for stripping each patch film 46 from the web material 48 is directly adjacent to an area where an affixing mechanism affixes a portion of the patch film to the personalized card. FIG. 8 shows one embodiment of the patch films 46 arranged on the web material 48. The patch films 46 can be spaced apart at a distance of about 4.0 inches (about 101.6 mm) from a leading edge of one patch film to a leading edge of the next patch film 46 (shown as A). The length of one patch film 46 can be about 3.31 inches (about 84.074 mm) in length (shown as B), where the length of the patch film 46 can be shorter on each end lengthwise by about 0.030 inches (about 0.762 mm) for a traditional 3.375 inch (about 85.725 mm) personalized card. In this manner, patch film 46 spacing may be decreased on the web material 48 to as low as 0.69 inches (about 17.526 mm) or lower (shown as C). Further, the number of patches per roll of web material 48 may be increased, which can lower patch film costs. In other embodiments, where only a portion of the personalized card is laminated, (i.e. laminating over the photograph on a driver's license), the patch film may have a height of about 1.42 inches (about 36.068 mm) and a length of about 1.09 inches (about 27.686 mm).

In some embodiments, the card path 18 drives the personalized card 40 in one direction toward and through the apparatus 10. In this embodiment, it will be appreciated that the spacing from a trailing edge of one patch film to a leading edge of the next patch film is limited only by the width of the planar end surface of the platen structure.

In other embodiments, the apparatus 10 may be configured so that the supply component 42 and or the take-up component 44 guides the web material 48 forward and backward through the apparatus 10, so as to position the patch film 46 with respect to the platen structure to thereby affix a portion of a patch film 46 onto the personalized card 40. In this embodiment, it will be appreciated that there may be no space required between patch films.

The present disclosure may provide advantages such that the platen structure may allow faster strip speed, which can achieve greater throughput. The narrow platen structure may allow a strip pin to be closer to the area of affixation by the platen structure, so as to be directly adjacent to the platen structure. In this manner, patch spacing on a web material may be decreased and the number of patch films per roll may be increased, so as to achieve a decrease in patch price.

The present disclosure can also provide a lamination shoe that is biased into a lamination ready position. In this manner, delay in card processing can be reduced, because the lamination shoe may already be in position to laminate the next personalized card right after processing a preceding card. A cutout portion may be provided in the lamination shoe, which can achieve better throughput for cards, including cards having laminate sensitive areas, for example cards with smart card chips. The heater element within the platen structure may also save on costs.

With regard to the foregoing description, it is to be understood that changes may be made in detail, especially in matters of the construction materials employed and the shape, size, and arrangement of the parts without departing from the scope of the present invention. It is intended that the specification and depicted embodiment be considered exemplary only, with a true scope and spirit of the invention being indicated by the broad meaning any following claims.

The invention claimed is:

1. An apparatus for laminating a personalized document, the apparatus comprising:
   a supply component containing a web material that is configured to deliver the patch film to the personalized document;
   a platen structure comprising a head portion having an end surface, configured to affix a portion of the patch film that is less than the entire patch film delivered by the supply component to a portion of one side of the personalized document that is less than the entire side of the personalized document;
   a take-up component configured to receive the web material after the patch film is delivered to the personalized document; and
   a lamination assembly configured to laminate a remaining unlaminated portion of the patch film to the personalized document after having the patch film partially affixed thereto by the platen structure.

2. The apparatus of claim 1, wherein the platen structure comprises a heating element for heating the end surface of the head portion to affix the portion of the patch film to the portion of one side of the personalized document.

3. The apparatus of claim 2, wherein the apparatus further comprises a thermocouple in the platen structure or an IR thermal detector for monitoring the temperature within the lamination assembly.

4. The apparatus of claim 1, wherein the end surface comprises a substantially planar end surface having a leading end and a trailing end and the planar end surface slightly radiuses towards the trailing end.

5. The apparatus of claim 1, wherein the head portion further comprises a plurality of side surfaces that taper toward the end surface.

6. The apparatus of claim 1, wherein the apparatus comprises a strip pin configured to facilitate removal of the patch film from the web material, the strip pin being disposed downstream of and adjacent to the platen structure proximate the end surface.

7. The apparatus of claim 1, the platen structure is configured to tack a portion of the patch film delivered by the supply component to a portion of one side of the personalized document.

8. The apparatus of claim 1, wherein the lamination assembly comprises:
   a heated lamination shoe;
   a backing roller that presses against the lamination shoe and is configured to laminate the remaining unlaminated portion of the patch film to the personalized document when a personalized document is delivered between the lamination shoe and the backing roller.

9. The apparatus of claim 8, wherein the lamination shoe is biased towards a lamination ready position.

10. The apparatus of claim 8, wherein the lamination shoe comprises an arcuate surface with a chord length longer than a length of the personalized document.

11. The apparatus of claim 8, wherein the lamination shoe comprises an arcuate surface with a chord length shorter than a length of the personalized document and configured to laminate only a portion of the personalized document.

12. The apparatus of claim 8, wherein the lamination shoe comprises a cutout portion corresponding to a laminate sensitive surface of the personalized document, whereby the cutout portion does not allow that portion of the lamination shoe to press against the personalized document.

13. The apparatus of claim 1, wherein the supply component comprises:
   the web material; and
   a plurality of patch films disposed thereon,
   the patch films are arranged and configured on the web material so as to be substantially close together.

14. The apparatus of claim 13, wherein the web material is arranged as a roll of web material.

15. The apparatus of claim 13, wherein a length of one patch film is about 3.31 inches and a leading edge of one patch film is about 4.0 inches away from a leading edge of the next patch film.

16. The apparatus of claim 13, wherein a length between a trailing edge of one patch film and the leading edge of the next patch film is less than or equal to 0.69 inches.

17. A method laminating personalized documents, the method comprising:

delivering a patch film disposed on a web material from a supply component to a personalized document;

contacting a platen structure to a portion of one side of the patch film that is less than the entire patch film;

affixing the portion of the patch film that is less than the entire patch film to a portion of one side of the personalized document that is less than the entire side of the personalized document using the platen structure;

laminating a remaining unlaminated portion of the patch film to the personalized document by a lamination assembly.

18. The method of claim 17, further comprising heating an end surface of the platen structure such that when the platen structure presses the portion of the patch film against the personalized document, the patch film is affixed to the portion of one side of the personalized document.

19. The method of claim 17, further comprising removing the patch film from the web material by a stripping pin.

20. The method of claim 17, further comprising biasing a lamination shoe towards a lamination ready position for laminating a subsequent patch film after laminating one patch film to the personalized document.

21. The method of claim 17, further comprising laminating the entire patch film to an entire side of the personalized document.

* * * * *